United States Patent
Dietz et al.

(10) Patent No.: US 8,678,637 B2
(45) Date of Patent: Mar. 25, 2014

(54) EXTRUDER SCREW, EXTRUDER AND SHAFT-HUB CONNECTION

(75) Inventors: Peter Dietz, Clausthal-Zellerfeld (DE); Guenter Schaefer, Goslar (DE); Ilaka Mupende, Clausthal-Zellerfeld (DE); Cem Turan, Clausthal-Zellerfeld (DE); Wolfgang Walter, Aalen (DE); Guenther Rduch, Lauf a. d. Pegnitz (DE)

(73) Assignee: Leistritz Aktiengesellschaft, Nuremberg (DE)

( * ) Notice: Subject to any disclaimer, the term of this patent is extended or adjusted under 35 U.S.C. 154(b) by 795 days.

(21) Appl. No.: 11/661,781

(22) PCT Filed: Aug. 19, 2005

(86) PCT No.: PCT/EP2005/008988
§ 371 (c)(1),
(2), (4) Date: Aug. 27, 2007

(87) PCT Pub. No.: WO2006/027096
PCT Pub. Date: Mar. 16, 2006

(65) Prior Publication Data
US 2008/0019212 A1    Jan. 24, 2008

(30) Foreign Application Priority Data

Sep. 3, 2004 (DE) .......................... 10 2004 042 746
Jun. 14, 2005 (EP) ....................................... 05012696

(51) Int. Cl.
*B01F 7/08* (2006.01)

(52) U.S. Cl.
USPC ............................................ 366/82; 366/79

(58) Field of Classification Search
USPC ..................................... 366/79, 82; 403/359.6
See application file for complete search history.

(56) References Cited

U.S. PATENT DOCUMENTS 581,476 A * 4/1897 Blanton, Jr. ................... 403/350
611,556 A * 9/1898 Blanton, Jr. ................... 403/352

(Continued)

FOREIGN PATENT DOCUMENTS

DE 69426583 T 5/2001
EP 0 637 696 2/1995

(Continued)

OTHER PUBLICATIONS

Machine translations, JP 2001165280 A and JP 200404460A (the former attached to the patent document), generated by JPO Dec. 13, 2008.*

(Continued)

*Primary Examiner* — Tony G Soohoo
*Assistant Examiner* — Anshu Bhatia
(74) *Attorney, Agent, or Firm* — Jordan and Hamburg LLP (57) ABSTRACT

An extruder screw includes a screw shaft with several screw elements which can be or have been detachably slipped onto this shaft, the screw shaft having an external gearing and the screw elements having an internal gearing which engage the external gearing. The profile of the teeth of the external and the internal gearing are asymmetric, whereby in relation to a preferred direction of rotation of the extruder screw, the torque-transferring flanks of the teeth of the external and the internal gearing make a smaller angle with the perpendicular to the axis of rotation than do respective opposing flanks, at the teeth, of the external and internal gearing.

40 Claims, 5 Drawing Sheets

(56) References Cited

U.S. PATENT DOCUMENTS

| | | | | |
|---|---|---|---|---|
| 1,779,805 | A | * | 10/1930 | Dunwoodie ............... 403/359.6 |
| 2,297,390 | A | * | 9/1942 | Burger ........................ 403/350 |
| 4,115,022 | A | * | 9/1978 | Orain ........................ 403/359.6 |
| 4,295,751 | A | * | 10/1981 | Holmberg .................... 403/306 |
| 4,799,844 | A | * | 1/1989 | Chuang ....................... 411/414 |
| 4,977,793 | A | * | 12/1990 | Husted ........................ 74/567 |
| 5,060,740 | A | * | 10/1991 | Yousef et al. ................ 175/415 |
| 5,120,212 | A | * | 6/1992 | Reiber et al. ................. 425/141 |
| 5,213,437 | A | * | 5/1993 | Sommer ................... 403/359.6 |
| 5,304,000 | A | | 4/1994 | Kowalczyk et al. |
| 5,356,236 | A | * | 10/1994 | Duboue .................... 403/359.6 |
| 5,439,286 | A | | 8/1995 | Kowalczyk et al. |
| 5,593,227 | A | | 1/1997 | Scheuring et al. |
| 5,647,683 | A | * | 7/1997 | Easley ...................... 403/359.6 |
| 5,697,850 | A | * | 12/1997 | Yaegashi et al. ............. 464/162 |
| 5,716,159 | A | | 2/1998 | Tomikawa |
| 5,975,271 | A | * | 11/1999 | Iwata .......................... 192/200 |
| 6,116,771 | A | | 9/2000 | Andersen |
| 6,155,705 | A | * | 12/2000 | Douris et al. ................... 366/79 |
| 6,241,375 | B1 | * | 6/2001 | Wang ............................ 366/82 |
| 6,739,540 | B2 | * | 5/2004 | Shiotani et al. ............... 242/374 |

FOREIGN PATENT DOCUMENTS

| | | | |
|---|---|---|---|
| JP | 5-340463 | | 12/1993 |
| JP | 07259872 A | * | 10/1995 ............... F16D 1/02 |
| JP | 2001165280 A | * | 6/2001 ............. F16H 55/16 |
| JP | 2003-163161 | | 6/2003 |
| JP | 2004-044660 | | 2/2004 |

OTHER PUBLICATIONS

Cylindrical Gears for General and Heavy Engineering—Standard Basic Rack Tooth Profile. 1998.*

* cited by examiner

EXTRUDER SCREW, EXTRUDER AND SHAFT-HUB CONNECTION

BACKGROUND OF THE INVENTION

The invention relates to an extruder screw consisting of a screw shaft with several screw elements, which can be or have been detachably slipped onto this shaft, the screw shaft having an external gearing and the screw elements having an internal gearing, which engages the external gearing.

Such extruder screws, which are also referred to as plug-in screws, are known and make a variable construction of an extruder screw possible in that, depending on the requirements, different screw elements, such as conveying, kneading or mixing elements may be disposed in different sequences on the screw shaft. In order to make it possible, on the one hand, to slip on these elements and, on the other, to transfer the torque, required in operation, from the screw shaft, into which the torque is passed by way of the extruder motor, a shaft hub gearing is provided between the screw shaft and the shaft elements, that is, the screw shaft has an external gearing, whereas the screw elements, functioning as hub, have an internal gearing on the inside of their borehole, both gearings meshing with one another.

Usually, shaft hub connections, conforming to the Standards DIN 5480, DIN 5464 or ISO 4156 in the form of an evolvent gearing, are used for extruder screws. This positive, symmetrical gearing enables an appreciable torque to be transferred, while, at the same time, the screw elements are easy to install and to dismantle.

Extruders generally must meet the requirements of the highest possible efficiency, which is reflected primarily in the achievable throughput. Moreover, within the framework of machine design, the available torque, that is, the torque that can be transferred effectively over the screw shaft to the screw elements, the rpm of the screw and, with that, the drive performance, as well as the available free screw volume represent the deciding design criteria. Generally, a high available torque is an advantage, because it permits, on the one hand, a higher degree of filling. Moreover, lower average shear velocities and lower product temperatures are achieved. The residence time of the product in the extruder is shortened, the stress on the product, on the whole, is less than in comparable process steps with a lower torque. On the whole, a higher torque permits a higher screw rpm and, with that, also a higher throughput.

However, there are limits to increasing the torque, primarily due to the characteristic values of the material of construction of the screw shaft and of the screw elements and the configurational strength of the elements, which is determined by the construction of the gearing. These limits, in the final analysis, determine the maximum torque that can be transferred. Admittedly, by certain material-specific after-treatments, slight increases in torque can still be achieved. However, these are marginal and, as a rule, associated with high costs.

A further possibility for increasing the throughput is to increase the available volume, which is usually given as the volumeness in the form of the ratio of the outer diameter of the screw $D_a$ to the internal diameter of the screw $D_i$. Usual volumenesses of double screw extruders, rotating in the same direction, range from 1.4 to a maximum of 1.6, for instance. Enlarging the volume by deepening the screw channels while keeping the distance between the axles the same admittedly offers an improved feed and less shear. At the same time, lower material temperatures are reached because of the lower input of energy, so that finally, the extruder can be run at a higher rpm, thus increasing the throughput. However, it is a disadvantage here that, as the volumeness increases and the distance between axles stays constant, the screw shaft becomes thinner or the wall of the screw element becomes very thin. At large volumenesses of more than 1.6, these geometrically induced circumstances make it impossible to transfer high torques anymore, since the forces, transferred by the screw shaft to the screw elements during the transfer of torque, lead to local, impermissible high stresses and finally to damage to the shaft-hub connection.

SUMMARY OF THE INVENTION

It is thus an object of the invention to indicate an extruder screw, which, by comparison, is an improvement and generally permits the transfer of very high torques, especially in the case of large volume screws.

For an extruder screw of the type mentioned above, this problem is solved pursuant to the invention owing to the fact that the profile of the teeth of the external and the internal gearing is asymmetric, whereby in relation to a preferred direction of rotation of the extruder screw, the torque-transferring flanks of the teeth of the external and the internal gearing make a smaller angle with the perpendicular to the axis of rotation than do respective opposing flanks, at the tooth, of the external and internal gearing.

Contrary to the prior art, the invention proposes the use of an asymmetric gearing with a special flank geometry. With this asymmetric gearing, a striking increase in torque can be achieved for different application cases of the extruder. The invention is based on the thought that extruder screws have a pronounced preferential direction of rotation, that is, during the operation of the extruder, that is, when material is being conveyed and processed, the screws turn exclusively in one direction. In relation to this direction of rotation and in the case of the inventive tooth profile, those tooth flanks of the external and internal gearing that engage one another and over which the torque is transferred from the external gearing of the shaft to the internal gearing of the hub make a relatively small angle with the perpendicular to the axis of rotation. On the other hand, the opposite tooth flank, which does not participate in the transfer of moment, makes a clearly larger angle with the perpendicular to the axis. Because of this asymmetry, the tooth foot of the inventive tooth profile is significantly broader than that of the exclusively symmetrical spline shaft gearing. This broader tooth foot enables a much higher torque to be transferred and the effect of any stresses occurring at the tooth foot, primarily stress concentrations, is significantly less for this reason. Because of the selected steepness of the torque-transferring, mutually engaging tooth flanks, that is, of the leading external gearing flank and of the trailing internal gearing flank, the radial stress components introduced into the hub are also reduced strikingly and tangential stresses are present essentially or exclusively, this portion of the stresses increasing as the steepness of the flanks increases. By these means, the expanding forces introduced into the hub over the load flanks are clearly reduced. This favors the use of materials that are sensitive to normal stresses, such as for instance fully hardened, wear-resistant screw elements and also has a very favorable effect on the stress behavior of hubs not having a rotational symmetrical outer contour (especially with very thin wall thicknesses in sections). In other words, the stress relationships during the transfer of torque are clearly improved by the asymmetric gearing that is used pursuant to the invention.

A further special advantage of the asymmetric tooth form lies therein that the number of teeth can be increased clearly in comparison to a conventional evolvent gearing. As a result, a higher load-carrying capability is attained and, with that, a higher torque can be transferred. Previously, in the case of conventional evolvent gearing, 24 teeth, for example, were provided because of the modulus selected. Now, however, by means of an appropriate selection of modulus, 36 teeth, for example, can be provided, which can transfer a much higher torque.

With that, the asymmetry of the shaft-hub connection, which is provided pursuant to the invention, permits a clear increase in the torque that can be transferred by the screw shaft to the individual elements in comparison to the symmetric gearing that is used exclusively in the prior art and is usually in the form of the evolvent gearing. This increase in torque can be achieved, moreover, in screws of any volumeness, since, because of the load-optimized and stress-optimized design of the profile, the stress in the connecting region is optimized to correspond to the actual circumstances. Even in screws of large volumeness, that is, with a $D_a/D_i$ ratio of more than 1.6, for which geometries, limiting the transferable torque, arise because of the reduced core thickness and/or wall thickness, resulting from the greater flight depth, striking increases in torque can be achieved and torques that could not be transferred previously could be achieved even at volumenesses of 1.65 or 1.7.

The smaller angle at the torque-transferring tooth flanks should be between 0° and 5°, that is, in the case of a 0° load flank, it extends radially to the axis of rotation and, at most, it assumes a very small angle of not more than 5°. The larger angle should be between 45° and 15°. For the further optimization, the smaller angle should be between 0° and 2° and the larger angle between 25° and 35°. According to a concrete and particularly advantageous flank geometry, the smaller angle is 0° and the larger angle 30°. In other words, the load flanks are perpendicular to the axis of rotation and the opposite flanks assume an angle of 30° to the axis of rotation. The engagement angle of the back flank in the given base interval of 45° to 15° and especially of about 30° enables, particularly advantageously, the screw to be rotated backwards, as is occasionally required in special cases for releasing a jammed screw. The 30° flank makes it possible here to transfer approximately the same torque as with a conventional DIN 5480 evolvent gearing, which, because of its symmetry, generally enables a uniform transferability in both directions of rotation and for which, as a rule, 30° flanks on either side are also provided. It should be pointed out here that, of course, any intermediate angle contained in the given maximum interval also is disclosed here as essential to the invention, even if the particular angular value is not mentioned explicitly.

In connection with an optimum transfer of torque, as well as, in particular, for minimizing expanding forces and/or radial forces, which are approximately zero for a 0° load flank, the mutually opposite flank sections, whether load flank or back flank, are configured with a plane surface in accordance with an advantageous development of the invention. The term "plane surface" is understood to be a flat surface, as well as a minimally spherical surface, here, in the event that this happens to be appropriate in one or another case. This applies also to the shape of the tooth heads of the external and the internal gearing, which also can be essentially plane.

In accordance with a particularly advantageous further development of the invention, a recess is provided at the tooth head of the internal gearing and/or the external gearing and is shaped and/or positioned in such a manner, that a tooth ridge remains at the optionally load-carrying tooth flank. The tooth head of the internal and/or external gearing is profiled superficially over at least one recess in such a manner that a camber or tooth ridge remains at the torque-transferring flank and falls off into the thereon adjoining recess, preferably over a rounding that is advantageous with respect to any stress concentrations. By these means, effects in the form of edge-pressing cambers in the region of mutually engaging, load-transferring flanks are minimized. Since the remaining tooth ridge or the camber can flow somewhat plastically, a decay in the forces or compressive stresses arising there can be achieved. This means that, by appropriate profiling, a plasticizable region is created there that is softer than the usual tooth cross-section and serves to decay stresses. This profiling at the tooth head may be provided preferably at the internal gearing of the screw elements, since, during the transfer of torque, the highest compressive stresses arise in the region of the torque-transferring tooth flank at the exposed corner to the tooth head. For optimizing the stress relationships, these stress peaks can be reduced advantageously because of the profiling provided pursuant to the invention. Moreover, the recess advisably should extend, starting from the tooth flank at the larger angle, essentially inwardly plane in the direction of the other tooth flank. A sort of plateau is thus formed at the tooth head and changes over into the higher tooth ridge. This plateau, as well as generally a tooth head having essentially a plane surface, of course reconstructs the external or internal radius at the place of the respective element and can therefore be bent easily, depending on the radius.

Furthermore, the high stress concentrations or notch stresses and the therefrom-resulting extreme load excess, resulting from the foot roundings, which, as a rule, are sharp, form a central problem limiting the transfer of torque in the prior art in the case of the symmetrical profiles. Admittedly, a full foot rounding is provided in ISO 4156 but it is disadvantageous because of the clear reduction in the core cross-section of the shaft or the cross-section of the element. Moreover, a constant rounding radius is provided by the ISO 4156 and comparable Standards. In every case, the increase in the transferable torques is also limited by this in the prior art.

On the other hand, pursuant to the invention, the base of the teeth of the external and internal gearing is rounded completely with a varying optimized radius. In the case of the inventive, asymmetrical tooth profile, this is readily possible because of the setting of the flanks. In spite of the full rounding, the core cross-section of the shaft, as well as the core cross-section of the elements, is decreased only insignificantly, since the foot, because of the asymmetry, is relatively broad and the varying rounding radii produce no or only a minimum reduction in the residual cross-sections. The fact that the number of teeth can be increased clearly and that therefore the distance between the teeth can be reduced, also plays a special role here. The radius in the base of the teeth of the external gearing may be between 0.35 m and 0.45 m and especially 0.4 m, and the radius at the base of the teeth of the internal gearing may be between 0.3 m and 0.4 m and especially 0.35 m. Of course, the radius selected depends on the diameter of the shaft and/or of the hub, as well as on the modulus selected.

The modulus of the external and internal gearing should furthermore be selected so that at least the teeth of the external gearing are elastic in bending at least in the region of the heads of the teeth. A slight bending elasticity at least in the upper region of a tooth is advantageous in that the tooth can adapt better to the counterpiece. Because of the asymmetry, the width of the tooth decreases in the direction of the head. As a result, if the modulus is appropriately high, a naturally slight bending elasticity for promoting a deviation-tolerant behavior in the region of the tooth head can be achieved, optionally utilizing a partially plastic deformation also in the foot region of the tooth. The modulus, which can originally be selected higher due to the asymmetry, in conjunction with the bending elasticity offers an even higher load-carrying capacity for further increasing the transferable torque, as well as for optimizing the positive connection between the gears.

A further improvement can be achieved if the gearing of the inventive extruder screw has diameter centering over bridge heads. Diameter centering can be used if the concentric running tolerances must meet special requirements.

Finally, the screw shaft, at least in the external gearing region, may consist of a plasticizable material, while the screw elements, at least in the region of the internal gearing, are correspondingly harder. This makes a certain plastic adaptation of the external gearing at the opposite gearing and, with that, an improvement in the positive connection and the transfer properties of the shaft-hub connection possible.

Aside from the extruder screw, the invention furthermore relates to an extruder, comprising one or more extruder screws of the type described above. The extruder may be a single screw extruder or a double screw extruder, with screws running in the same or opposite directions, or a multi-shaft extruder. The advantages, achievable with the inventive extruder screw can be realized equally with the different types of extruders. In particular, using the inventive extruder screws, high-performance extruders with very high volumeness of more than 1.6, for example, of 1.65 to 1.7 can be realized, which permit very high torques to be transferred and/or high specific torque densities $M_d/a^3$ ($M_d$=torque, a=distance between axles) to be realized. Furthermore, they permit high rpms, since the shaft-hub connection is optimized with respect to the transfer of torque as well as with respect to the resulting compressive and notch stresses.

Aside from the extruder screw having an inventive, asymmetric shaft-hub connection, the invention generally relates to such shaft-hub connections for which the shaft has an external gearing and the hub an internal gearing engaging the former. This inventive shaft-hub connection is distinguished owing to the fact that the profile of the teeth of the external and internal gearing is asymmetric, the flanks of the teeth of the external and the internal gearing, transferring the torque, making a smaller angle with a perpendicular to the axis of rotation than do the tooth flanks of the opposing external and internal gearing at the tooth, in relation to a preferred direction of rotation of the shaft. As already described above, this asymmetry of the gearing permits high torques to be transferred in the preferred direction of rotation. Further advantages of the inventive shaft-hub connection and the shaft-hub arrangement arise out of the dependent claims.

BRIEF DESCRIPTION OF THE DRAWINGS

Further advantages, distinguishing features and details of the invention arise out of the examples described in the following and from the accompanying drawings.

DESCRIPTION OF THE PREFERRED EMBODIMENTS

Figure 1:
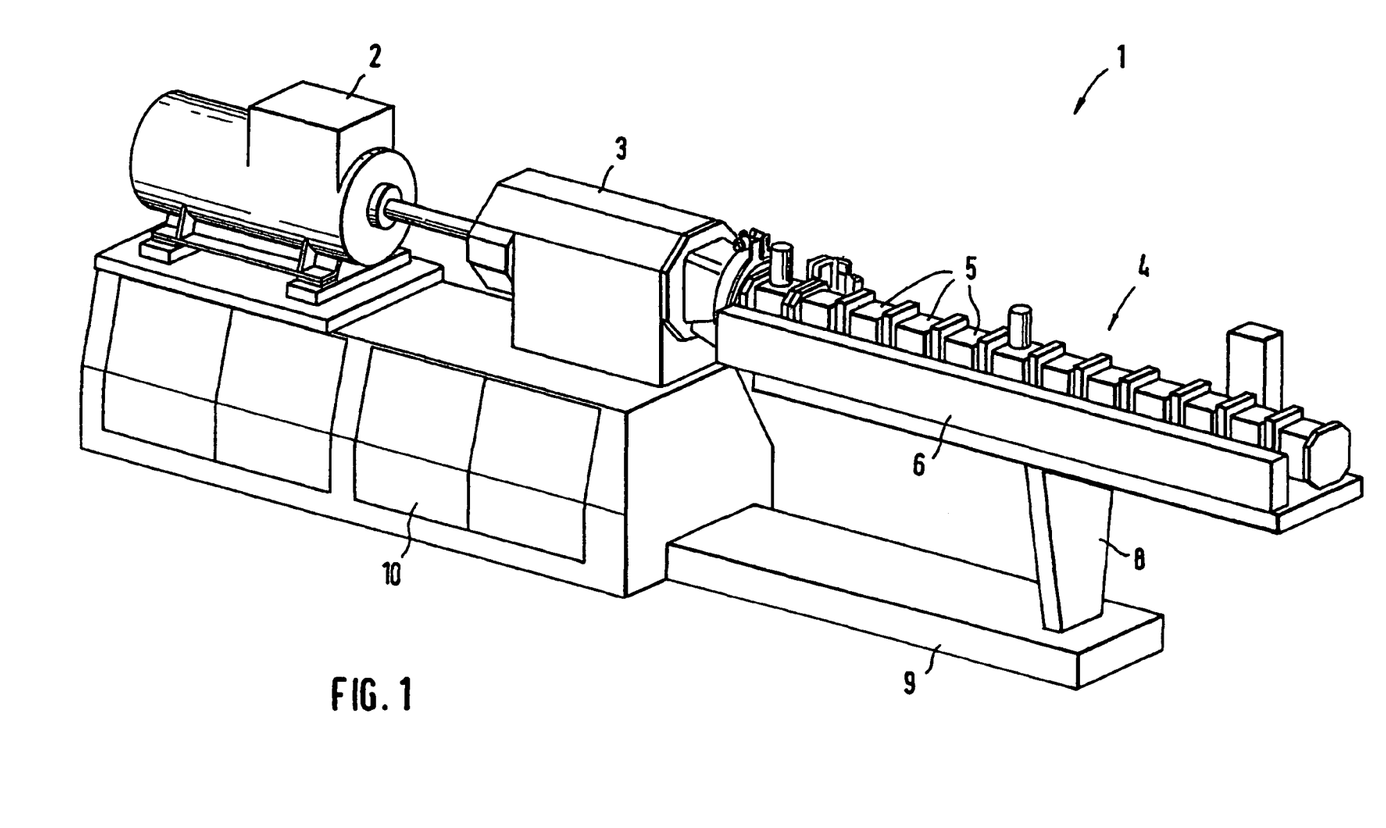
FIG. 1 shows a diagrammatic representation of an extruder.

FIG. 1 shows an extruder 1 with a motor 2, to which is connected a transmission 3 and an extrusion cylinder 4, consisting of several cylinder sections 5, in the interior of which, in the examples shown, two extruder screws are accommodated in appropriate boreholes and are driven over the transmission 3, with which they are coupled over a well-known coupling, the details of which are not shown. For example, the screws of the extruder are rotating in the same direction. The extrusion cylinder 4, together with all necessary cooling agent pipes, power leads and control leads, which are placed in an appropriate built-in box 6, are built-up on a carrier 7, which, in turn, is supported on a bearer 8 of the machine frame 9. A supply and control cabinet 10 contains the cooling agent and supply facilities, as well as the control devices, over which the individual components are supplied. The construction of such an extruder is adequately known.

As described, two extruder screws are disposed in the interior of the extrusion cylinder and consist of several cylinder sections 5 which are connected detachably with one another. The extruder screws under discussion are so-called plug-in screws, which can be constructed and/or configured especially with regard to the material to be processed or the product to be produced. If necessary, they can be removed from the extrusion cylinder 4.

Figure 2:
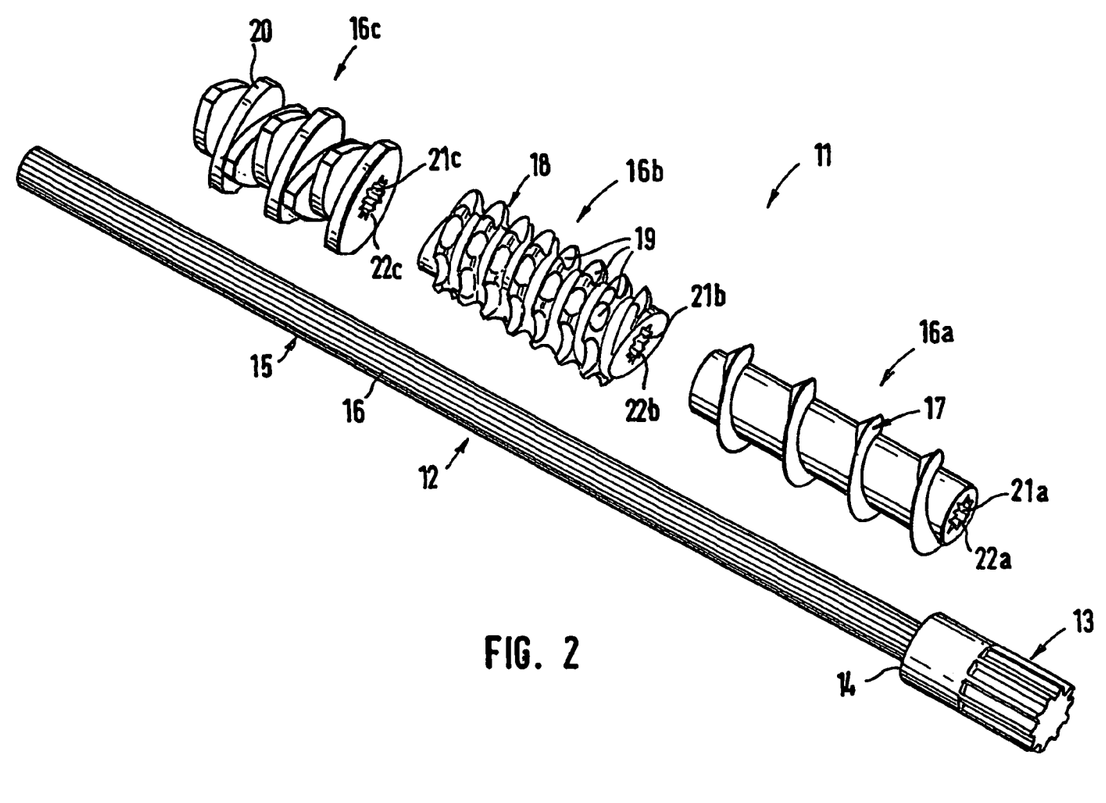
FIG. 2 shows a diagrammatic representation of an exploded view of a plug-in extruder screw.

In the form of a diagrammatic representation, FIG. 2 shows an extruder screw 11, consisting of a shaft 12, which, at its rear wider end, has, on the one hand, a first external gearing 13, over which it can be coupled with and driven by the transmission 3. A shaft section 15 with an external gearing 16 adjoins at a stop 14. Separate screw elements, which differ depending on the material to be processed and the product to be produced, can be slipped onto this shaft section 15 and placed against the stop 14. By way of example, FIG. 2 shows an example with three screw elements 16a, 16b and 16c. The screw element 16a may, for example, be a conveying element, which has a screw 17, in the screw flight of which the material is conveyed. The screw element 16b may, for example, be a mixing element, which also has a screw 18, which has apertures 19. Finally, the screw element 16c may be a kneading element which has appropriate kneading sections 20. The material, which is to be processed, is worked with a high input of energy by such a kneading element and, for example, plasticized or melted, depending on the application.

Each screw elements 16a, 16b, 16c has a central borehole 21a, 21b, 21c, by means of which it can be slipped onto the shaft section 15 and at the inside of which, that is, the hub, an internal gearing 22a, 22b, 22c is provided, with which it is slipped onto the external gearing 16 of the shaft section 15, so that the internal gearing and the external gearing can mesh with one another. The connection is a positive shaft-hub connection, which is described in detail in the following.

Figure 3:
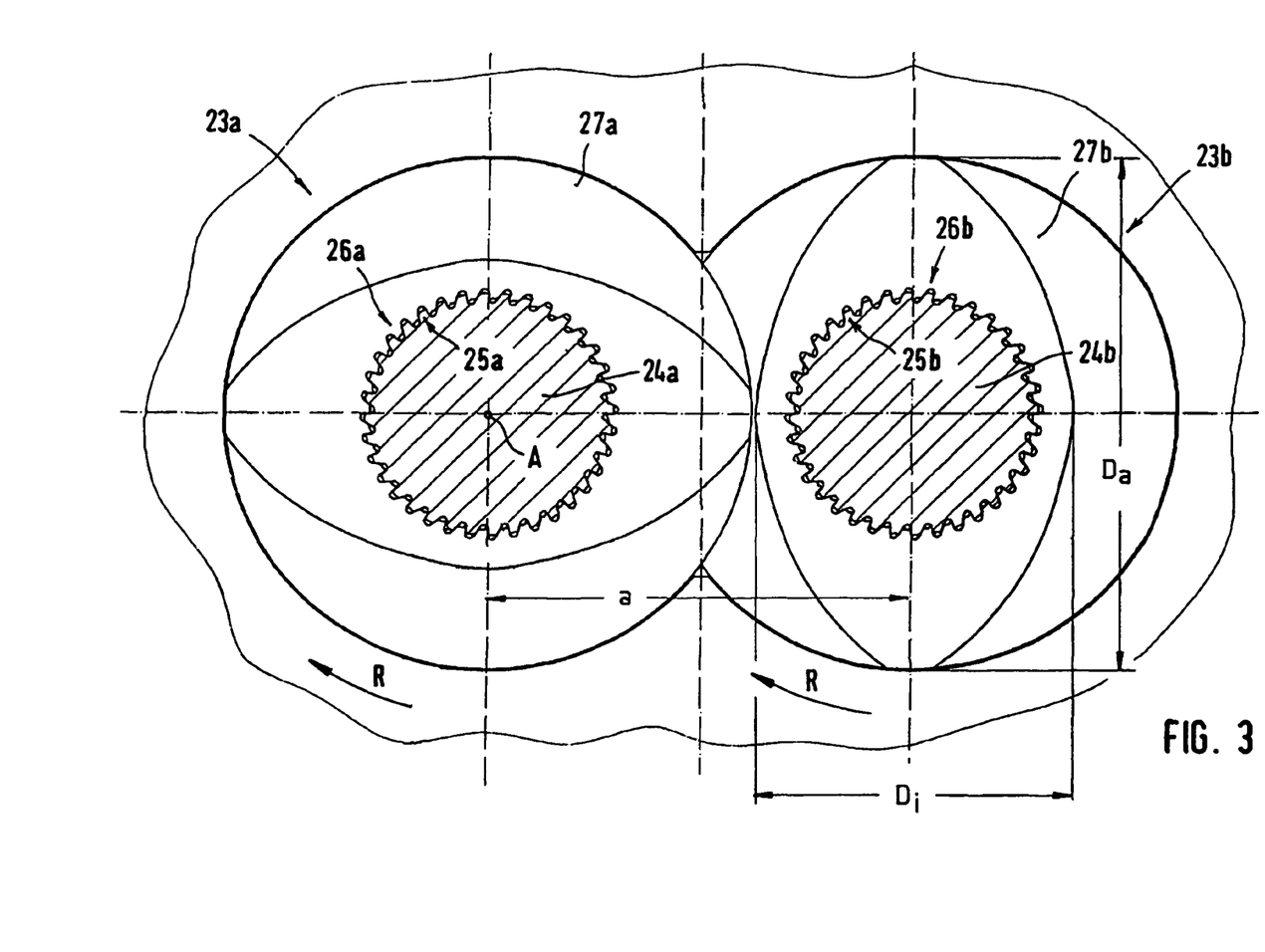
FIG. 3 shows a sectional view through two inventive extruder screws that are shown in their installed position, rotate in the same direction and mesh with one another.

FIG. 3 shows two inventive extruder screws 23a, 23b, which are shown parallel next to one another in the manner in which they are positioned relative to one another in the extrusion cylinder 4. The screw shafts 24a, 24b are separated by the axial distance "a" from one another. Furthermore, the external screw diameter $D_a$, as well as the internal screw diameter $D_i$ at the screw base is shown. The volumeness of the screw or of the extruder results from the ratio $D_a/D_i$, the volumeness being a characteristic quantity of an extruder.

Furthermore, the external gearing 25a and 25b of the respective shaft 24a and 24b is shown, as well as the internal gearings 26a and 26b at the hub of the respective screw elements 27a and 27b. It can be seen from FIG. 3 that the screw profiles in each case are asymmetric and are designed especially in relation to a particular preferred direction of rotation of the extruder screws 23a, 23b, which is shown by the two arrows marked R. Details of the inventive gearing geometry arise out of FIGS. 4 and 5.

Figure 4:
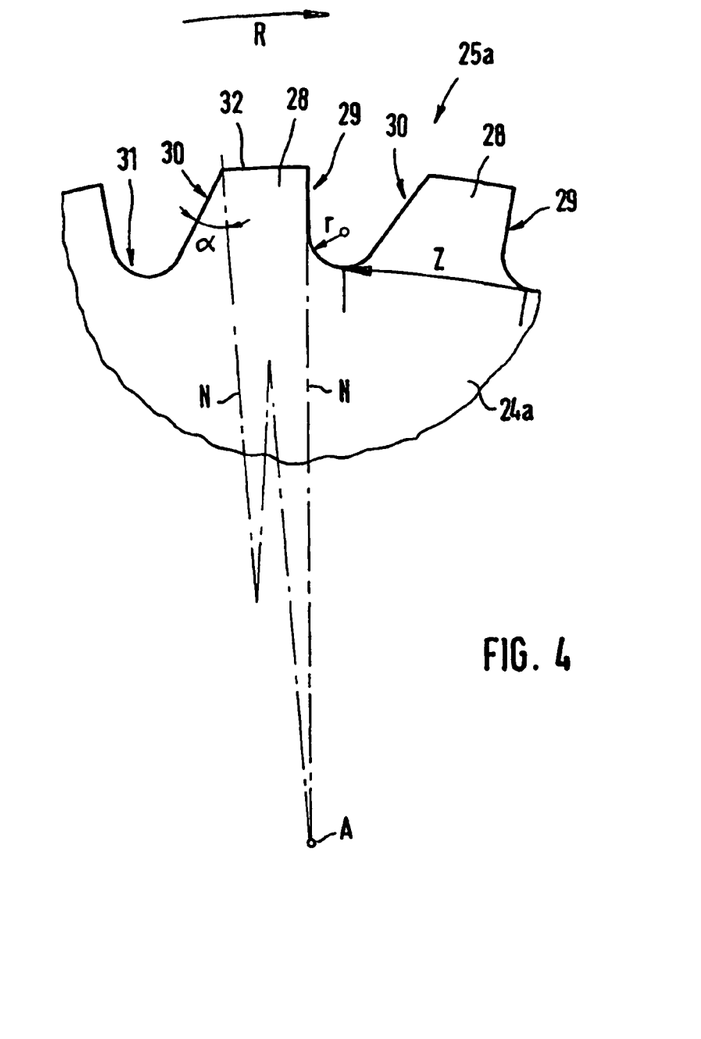
FIG. 4 shows an enlarged representation of the external gearing of the screw shaft.

In the form of an enlarged, detailed view, FIG. 4 shows a section of the external gearing 25a of the screw shaft 24a, the same applying correspondingly also to the gearing of shaft 24b. The teeth 28 are shown in a detailed view. In relation to the preferred direction of rotation R, each tooth 28 has a leading tooth flank 29 which interacts or engages with a corresponding tooth flank of the internal gearing at the screw element. Opposite to this, there is the trailing rear flank 30 of a tooth 28, which, during movement in the preferred direction of rotation R, usually has a minimum distance (flank clearance) from the corresponding, opposite tooth flank of the internal gearing of the order of a few one hundredths of a millimeter.

The inventive, asymmetric tooth profile is distinguished owing to the fact that the leading, torque-transferring or load-transferring tooth flank 29, which is constructed having a plane surface at least in its upper region towards the free tooth head, makes an angle of 0° with a line N perpendicular to the axis of rotation A of the screw shaft. This means that the tooth flank 29 extends radially to the axis of rotation A in the load-carrying region engaging the opposite flank.

On the other hand, the trailing tooth flank 30 makes an angle α of 30° with the perpendicular N to the axis of rotation A. This tooth flank 30 also has a plane surface up to the transition into the base of a tooth. Evidently, because of this arrangement, a very broad tooth foot Z is formed, according to which the tooth flanks move apart in the direction of the tooth base 31. The base 31 of the tooth furthermore is rounded completely. This is possible because of the width of the tooth foot Z and the space between the teeth, which tapers in the direction of the shaft core. The rounding radius r is, for example, 0.35 m. In the example shown, the tooth head 32 itself essentially has a plane surface; it is merely arched slightly to correspond to the external radius of the external gearing.

Figure 5:
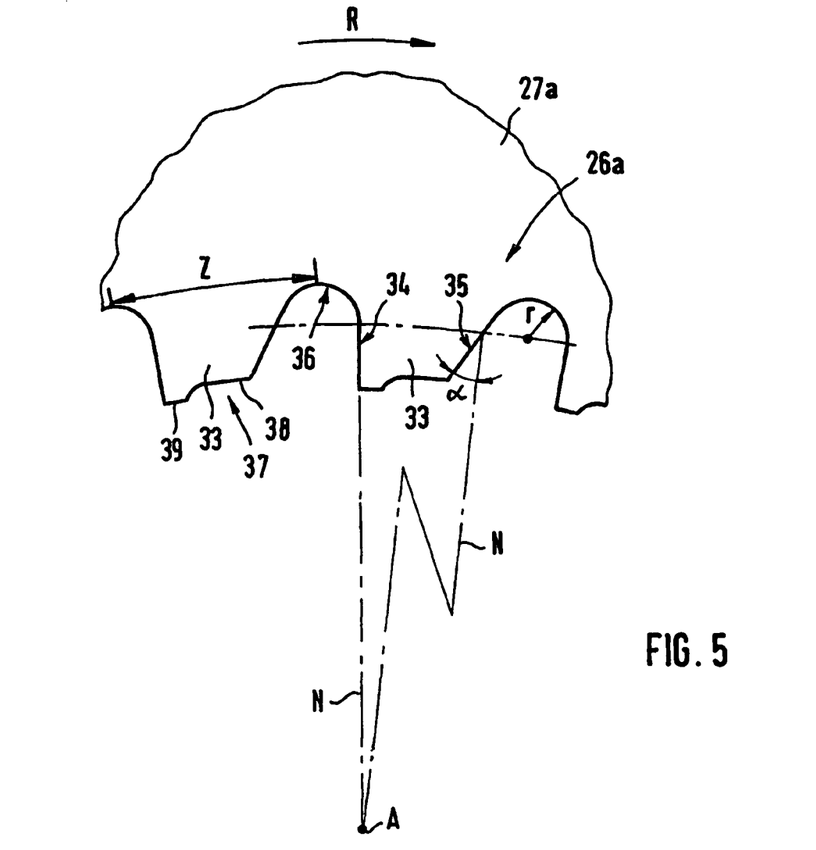
FIG. 5 shows an enlarged representation of the internal gearing of a screw element.

The profile of the internal gearing 26a of the screw element 27a, which is shown in FIG. 5, is conceived in a similar manner. Corresponding comments, of course, also apply to the internal gearing 26b. Here also the teeth 33 are shown, each tooth 33 having a trailing flank 34 which is torque-transferring or load-transferring in relation to the preferred direction of rotation R. Here also, the flank 34 makes an angle of 0° with the perpendicular N to the axis of rotation A of the screw shaft. The opposite tooth flank 35, leading in the preferred direction of rotation R, also makes an angle α of 30° with the perpendicular N to the axis of rotation A. This means that the angular position of the individual flanks corresponds identically to that of the external gearing, which makes a good positive connection possible. Here also, of course, the corresponding tooth flanks in adjoining regions are constructed with a plane surface.

Here also, the resulting tooth foot Z is very broad in comparison to a conventional, symmetrical, spline gearing. As described, this can be attributed to the tooth flanks, which move apart in the direction of the tooth base. Likewise, the tooth base 36 is rounded off completely, the radius r being approximately 0.4 m here. The possibility of rounding completely is also attributable here to the very broad tooth foot Z and the therefrom resulting, tapering tooth base 36. The complete rounding advantageously leads to a lesser decrease in the respective core cross section in the case of the screw shaft as well as of the screw elements. This means that the special advantages resulting from the rounding in terms of the stress concentration can also be used for the inventive gearing.

Contrary to what is the case with the tooth head 32 of the external gearing, the tooth head 37 of the internal gearing is profiled. A recess 38 is provided, which extends from the leading tooth flank 35, which is at an angle of 30°, to the trailing, 0° load flank 34, but runs out over a radius, so that a tooth bridge 39 remains, which extends up to the load flank 34. This tooth bridge 39, which results from a material recess, makes possible a strong decay particularly of compressive stresses, which arise in particular in this region during the transfer of torque, by a plastic flow of the tooth bridge material. By these means, the effect of the edge pressure excess in this region can advantageously be minimized because of the decrease in stress.

Figure 6:
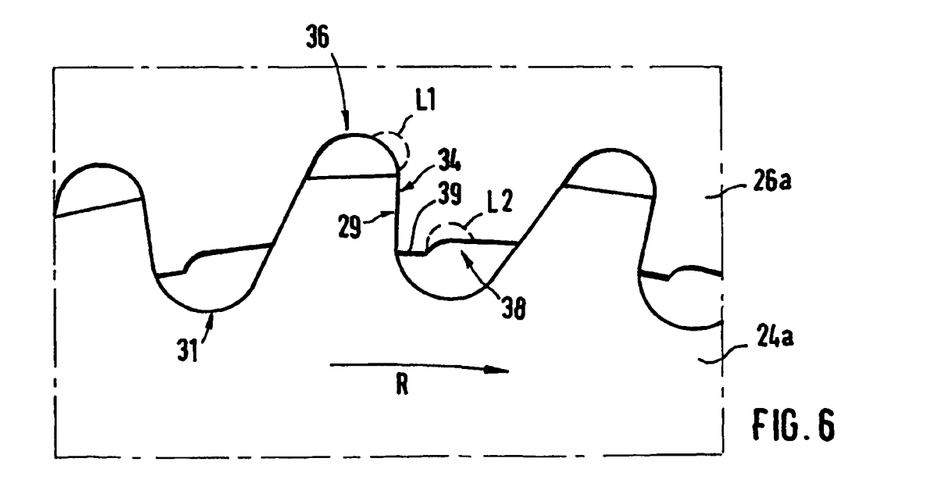
FIG. 6 shows a representation of the two gearings meshing with one another.

FIG. 6 diagrammatically shows the two gearings engaging one another. If the screw shaft 24a rotates in the preferred direction R, torque is transferred from the 0° tooth flank 29 to the 0° tooth flank 34. It is evident that, because of their plane surfaces and their angle, which is identical everywhere, the tooth flanks are in contact with one another over a large area, so that the surface pressure is reduced. Reducing the surface pressure is furthermore useful since, because of the asymmetric profile, the number of teeth of the respective gearings can be increased clearly, that is, as a result of the profile symmetry, the modulus selected can be larger than that in the case of a comparable, symmetrical standard gearing.

In other respects, the 0° tooth flank permits thermal expansion preferably in the radial direction, parallel to the load flank. Moreover, a clearance-free transfer of torque is possible. For this reason, the inventive asymmetric profile is also suitable for temperature-related changes in stress. Furthermore, the 0° flank leads to a minimization of expanding forces in the hub, that is, of the internal gearing of the screw element. Because of the position of the flanks to one another, forces, which are introduced in the respective teeth of the internal gearing, are almost exclusively tangential forces and not radial forces, which are introduced in the case of the usual serrated shaft profiles. This makes it possible to also use materials that are sensitive to normal stresses, such as fully hardened, wear-resistant materials in the region of the internal gearing, or to use ceramic elements. Especially in the case of wall thicknesses, which are very slight in sections, the response of the hub to stress is affected advantageously because of the minimizing of expansion forces.

The respective rounding in the respective tooth base 31 and 36 has a particularly advantageous effect. The highest stresses and, with that, the highest stress concentrations occur at the transitions from the load-carrying tooth flanks 29 and 43 to the tooth base. However, the stress concentrations can be reduced clearly by optimizing the geometry in the tooth base by fully rounding the foot. At the same time, however, because of the relatively small rounding radii resulting from the narrowing of the spaces between the teeth, the cross-section of the shaft core and the corresponding cross section at the screw element remain adequately large. Contrary to symmetric serrated shaft profiles with a very wide space between teeth and very sharp transitions from tooth to tooth base, the region of increased stresses, because of the complete rounding, is a relatively small. In FIG. 6, this region is indicated by the broken line L1.

As described, compressive stresses, resulting in these edge regions, can decay over the tooth bridge 39. Due to the plastic behavior of this tooth bridge, the compressive stresses are shifted and a stress center is formed, as shown by the line L2, in the region of the transition of the tooth bridge 39 to the recess 38.

A further advantage of the inventive, asymmetric tooth profile lies therein that, at least in the upper region of the tooth head, a tooth is somewhat elastic in bending, since it tapers clearly from the foot to the head, as shown in the Figures. This elasticity in bending is beneficial and promotes a deviation-tolerant behavior optionally with utilization of a slight, partially plastic de-formation of the tooth foot region. This means that, because of the elasticity in bending, the possibility exists of adapting and equalizing any tolerances during the transfer of torque to the counter-bearing, that is, to the tooth of the internal gearing. This is so particularly because, as a rule, the internal gearing is clearly harder and optionally surface-treated in a special way. Preferably, a material with a high yield stress is selected for the screw and leads to an increased fatigue strength even under dynamic loads. An increase in torque can, moreover, generally be attained, for example, by shot blasting, additional rolling, cold rolling or the like of the gear parts in the region of the external as well as of the internal gearing.

Over all, the inventive extruder screw and the inventive, asymmetric profile offer the possibility of being able to transfer torques that are clearly higher than those that can be transferred with comparable symmetrical profiles, which results from the inventive profile form. Because a geometry optimized with respect to stress concentrations and compressive stresses is proposed. A further advantage lies in the possibility of increasing the number of teeth clearly, which also is necessary for the possibility of increasing the torque that can be transferred. Finally, a particular advantage can be seen therein that, by using the inventive profile, the possibility is given for the first time of offering high torques even in the case of screws designed with an extremely large volume or of extruders having a $D_i/D_a$ ratio of more than 1.6, for example of 1.66, 1.68 or 1.70 or more. This leads to a striking increase in the performance of the inventive extruder and produces throughputs not previously attainable.

The invention claimed is:

1. An extruder screw, comprising a screw shaft with several screw elements which can be or have been detachably slipped onto the screw shaft, the screw shaft having an external gearing and the screw elements having internal gearing which engages the external gearing, a profile of teeth of the external and the internal gearing being asymmetric and configured such that in relation to a preferred direction of rotation of the extruder screw, torque-transferring flanks of the teeth of the external and the internal gearing make a smaller angle with a perpendicular to an axis of rotation than a larger angle with the perpendicular to the axis of rotation of respective opposing flanks at the teeth of the external and internal gearing, wherein each one of the torque-transferring flank and opposing flank of each tooth of the internal and external gearing have a planar surface, each said planar surface extending to a round base that extends between neighboring teeth.

2. The extruder screw of claim 1, wherein the smaller angle is greater than 0° and no greater than 2°.

3. The extruder screw of claim 1, wherein the smaller angle is greater than 0° and no greater than 5°.

4. The extruder screw of claim 1, wherein the mutually opposite flank sections of the external and internal gearing have a plane surface.

5. The extruder screw of claim 1, wherein a tooth head of the external and/or the internal gearing essentially has a plane surface.

6. An extruder screw, comprising:
a screw shaft with several screw elements which can be or have been detachably slipped onto the screw shaft, the screw shaft having an external gearing and the screw elements having internal gearing which engages the external gearing, teeth of the external and the internal gearing each having an asymmetric profile which is configured such that in relation to a preferred direction of rotation of the extruder screw, torque-transferring flanks of the teeth of the external and the internal gearing make a smaller angle with the perpendicular to the axis of rotation than a larger angle with the perpendicular to the axis of rotation of respective opposing flanks at the teeth of the external and internal gearing, wherein a recess is provided in a tooth head of the internal gearing and/or of the external gearing, said recess being formed and/or positioned in such a way that a tooth bridge remains adjacent to the tooth's torque-transferring flank.

7. The extruder screw of claim 6, wherein the recess extends from the tooth flank that makes the larger angle, essentially in a plane surface in the direction of the other tooth flank.

8. The extruder screw of claim 1, wherein a tooth base of the external and the internal gearing is fully rounded.

9. The extruder screw of claim 1, wherein a modulus of the external and the internal gearing is selected so that at least the teeth of the external gearing are elastic in bending at least in the tooth head region.

10. The extruder screw of claim 1, wherein the screw shaft, at least in a region of the external gearing, comprises a plasticizable material, whereas the screw elements are comparatively harder, at least in a corresponding region of the internal gearing.

11. An extruder, comprising one or more extruder screws of claim 1.

12. The extruder of claim 11, wherein when two or more extruder screws are used, the extruder screws rotate in the same or in an opposite direction.

13. A shaft-hub connection, comprising:
a shaft having external gearing; and
a hub having internal gearing which engages the external gearing, a profile of teeth of the external and the internal gearing being asymmetric and configured such that in relation to a preferred direction of rotation of the shaft, torque-transferring flanks of the teeth of the external and the internal gearing make a smaller angle with a perpendicular to the axis of rotation than a larger angle with the perpendicular to the axis of rotation of respective opposing flanks, at the teeth, of the external and internal gearing, wherein each one of the torque-transferring flank and opposing flank of each tooth of the internal and external gearing have a planar surface, each said planar surface extending to a round base that extends between neighboring teeth.

14. The shaft-hub connection of claim 13, wherein the smaller angle is greater than 0° and no greater than 2°.

15. The shaft-hub connection of claim 13, wherein the smaller angle is greater than 0° and no greater than 5°.

16. The shaft-hub connection of claim 13, wherein mutually opposite flank sections of the external and internal gearing have a plane surface.

17. The shaft-hub connection of claim 13, wherein tooth heads of the external and/or the internal gearing essentially have a plane surface.

18. A shaft-hub connection, comprising:
a shaft having external gearing; and a hub having internal gearing which engages the external gearing, teeth of the external and the internal gearing each having an asymmetric profile and configured such that in relation to a preferred direction of rotation of the shaft, torque-transferring flanks of the teeth of the external and the internal gearing make a smaller angle with the perpendicular to the axis of rotation than a larger angle with the perpendicular to the axis of rotation of respective opposing flanks, at the teeth, of the external and internal gearing, wherein a recess is provided in the tooth head of the internal gearing and/or the external gearing, said recess being formed and/or positioned in such a way that a tooth bridge remains adjacent to the tooth's torque-transferring flank.

19. The shaft-hub connection of claim 18, wherein the recess extends from the tooth flank making the larger angle essentially with a plane surface in the direction of the other tooth flank.

20. The shaft-hub connection of claim 13, wherein a tooth base of the external and the internal gearing is rounded out.

21. The shaft-hub connection of claim 13, wherein a modulus of the external and the internal gearing is selected so that at least the teeth of the external gearing are elastic in bending at least in a tooth head region.

22. The shaft hub connection of claim 13, wherein the shaft, at least in the region of the external gearing, comprises a plasticizable material, whereas a hub, at least in the region of the internal gearing, is correspondingly harder.

23. A shaft-hub connection, comprising:
a shaft having external gearing formed by a uniform pattern of first teeth; and
a hub having internal gearing which engages the external gearing, the internal gearing being formed by a uniform pattern of second teeth;
wherein all first teeth are asymmetric having a torque-transferring leading flank defined for a preferred direction of rotation of the shaft and engaged hub, said torque-transferring leading flank having a planar face that forms a first angle relative to a perpendicular to an axis of rotation of the shaft;
wherein all first teeth have a trailing flank defined for said preferred direction of rotation, said trailing flank having a planar face that forms a second angle relative to said perpendicular to said axis of rotation of the shaft;
wherein all second teeth are asymmetric having a torque-transferring flank defined for said preferred direction of rotation, said torque-transferring flank having a planar face that forms a third angle relative to said perpendicular to said axis of rotation of the shaft;
wherein all second teeth have a leading flank defined for said preferred direction of rotation, said leading flank having a planar face that forms a fourth angle relative to said perpendicular to said axis of rotation of the shaft;
wherein said second angle is greater than said first angle and said fourth angle is greater than said third angle; and
wherein said torque-transferring leading flank and said torque-transferring flank abut and wherein said trailing flank and leading flank abut.

24. The shaft-hub connection of claim 23,
wherein said gearing on the shaft further includes a first round base between each adjacent one of said first teeth, the first round base ending at the planar face of the torque-transferring leading flank of one first tooth and the planar face of the trailing flank of an adjacent first tooth,
wherein said gearing on the hub includes a second round base between each adjacent one of said second teeth, the second round base ending at the planar face of the torque-transferring flank of one second tooth and the planar face of the leading flank of an adjacent second tooth,
wherein the leading flank and torque-transferring flank of said one second tooth do not protrude into the first round base between the abutting trailing flank and torque-transferring leading flank of said one first tooth and adjacent first tooth, and
wherein the trailing flank and torque-transferring leading flank of said one first tooth do not protrude into the second round base between the abutting leading flank and torque-transferring flank of said one second tooth and adjacent second tooth.

25. The shaft-hub connection of claim 23, wherein each one of either one or both of said first teeth and said second teeth further has a distal end occurring between ends of said torque-transferring leading flank and said trailing flank or ends of said torque-transferring flank and said leading flank, said distal end extending toward a base between adjacent first teeth of the shaft without abutting said base, said distal end having a bridge portion and a recess portion, the bridge portion extending closer to said base than said recess portion.

26. The shaft-hub connection of claim 25, wherein said distal end is configured to embody a transition region in an area of said recess portion adjacent said bridge portion that serves as a stress center into which compressive stress is shifted from said torque-transferring flank of said one second tooth during turning of the shaft and engaged hub.

27. The shaft-hub connection of claim 23, wherein the planar face of the torque-transferring leading flank of said one first tooth extends an entire length of the torque-transferring leading flank, wherein the planar face of the torque-transferring flank of said one second tooth extends an entire length of the torque-transferring flank of said one second tooth.

28. The shaft-hub connection of claim 23, wherein the planar face of the leading flank of said one second tooth extends an entire length of the leading flank of said one second tooth, and wherein the planar face of the trailing flank of said one first tooth extends an entire length of the trailing flank of said one first tooth.

29. The shaft-hub connection of claim 23, wherein the first angle formed relative to said perpendicular to said axis of rotation of the shaft is between 0° and 5°; wherein the second angle formed relative to said perpendicular to said axis of rotation of the shaft is between 15° and 45°; wherein the third angle relative to said perpendicular to said axis of rotation of the shaft between 0° and 5'; and wherein the fourth angle formed relative to said perpendicular to said axis of rotation of the shaft is between 15° and 45°.

30. The shaft-hub connection of claim 23, wherein each of the first angle and the third angle is between 0° and 2°, and wherein each one of the second angle and the fourth angle is between 25° and 35°.

31. The shaft-hub connection of claim 23, wherein each of the first angle and the third angle is 0°, and wherein each one of the second angle and the fourth angle is 30°.

32. An extruder screw, comprising:
a screw shaft; and
a plurality of screw elements detachably engaged to the screw shaft;
wherein the screw shaft has an external gearing and the screw elements have internal gearing which engages the external gearing;

wherein the external gearing has first teeth forming a uniform pattern;

wherein the internal gearing has second teeth forming another uniform pattern;

wherein all first teeth are asymmetric having a torque-transferring leading flank defined for a preferred direction of rotation of the screw shaft and the screw elements engaged with the screw shaft;

wherein said torque-transferring leading flank has a planar face that forms a first angle relative to a perpendicular to an axis of rotation of the screw shaft;

wherein all said first teeth have a trailing flank defined for said preferred direction of rotation, said trailing flank having a planar face that forms a second angle relative to said perpendicular to said axis of rotation of the screw shaft;

wherein all said second teeth are asymmetric having a torque-transferring flank defined for said preferred direction of rotation, said torque-transferring flank having a planar face that forms a third angle relative to said perpendicular to said axis of rotation of the screw shaft;

wherein all said second teeth have a leading flank defined for said preferred direction of rotation, said leading flank having a planar face that forms a fourth angle relative to said perpendicular to said axis of rotation of the screw shaft;

wherein said second angle is greater than said first angle and said fourth angle is greater than said third angle; and wherein said torque-transferring leading flank and said torque-transferring flank abut and wherein said trailing flank and leading flank abut.

33. The extruder screw of claim 32, wherein said external gearing on the screw shaft further has a first round base between each adjacent one of said first teeth, the first round base ending at the planar face of the torque-transferring leading flank of one first tooth and the planar face of the trailing flank of an adjacent first tooth, wherein said internal gearing on the screw elements further has a second round base between each adjacent one of said second teeth, the second round base ending at the planar face of the torque-transferring flank of one second tooth and the planar face of the leading flank of an adjacent second tooth, wherein the leading flank and torque-transferring flank of said one second tooth do not protrude into the first round base between the abutting trailing flank and wherein the trailing flank and torque-transferring leading flank of said one first tooth do not protrude into the second round base between the abutting leading flank and torque-transferring flank of said one second tooth and adjacent second tooth.

34. The extruder screw of claim 32, wherein each one of either one or both of said first teeth and said second teeth further has a distal end occurring between ends of said torque-transferring leading flank and said trailing flank or ends of said torque-transferring flank and said leading flank, said distal end extending toward a base between adjacent first teeth of the screw shaft without abutting said base, said distal end having a bridge portion and a recess portion, the bridge portion extending closer to said base than said recess portion.

35. The extruder screw of claim 34, wherein said distal end is configured to embody a transition region in an area of said recess portion adjacent said bridge portion that serves as a stress center into which compressive stress is shifted from said torque-transferring flank of said one second tooth during turning of the screw shaft and engaged plurality of screw elements.

36. The extruder screw of claim 32, wherein the planar face of the torque-transferring leading flank of said one first tooth extends an entire length of said torque-transferring leading flank of said one first tooth and adjacent first tooth, and of the torque-transferring leading flank; and wherein the planar face of the torque-transferring flank of said one second tooth extends an entire length of the torque-transferring flank of said one second tooth.

37. The extruder screw of claim 32, wherein the planar face of the leading flank of said one second tooth extends an entire length of the leading flank of said one second tooth; and wherein the planar face of the trailing flank of said one first tooth extends an entire length of the trailing flank of said one first tooth.

38. The extruder screw of claim 32, wherein the first angle formed relative to said perpendicular to said axis of rotation of the screw shaft is between 0° and 5°;

wherein the second angle formed relative to said perpendicular to said axis of rotation of the screw shaft is between 15° and 45°;

wherein the third angle relative formed to said perpendicular to said axis of rotation of the screw shaft is between 0° and 5°; and wherein the fourth angle formed relative to said perpendicular to said axis of rotation of the screw shaft is between 15° and 45°.

39. The extruder screw of claim 32, wherein each of the first angle and the third angle is between 0° and 2°; and wherein each one of the second angle and the fourth angle is between 25° and 35°.

40. The extruder screw of claim 32, wherein each of the first angle and the third angle is 0'; and wherein each one of the second angle and the fourth angle is 30°.

* * * * *

UNITED STATES PATENT AND TRADEMARK OFFICE
CERTIFICATE OF CORRECTION

PATENT NO.        : 8,678,637 B2
APPLICATION NO.   : 11/661781
DATED             : March 25, 2014
INVENTOR(S)       : Peter Dietz et al.

Page 1 of 1

It is certified that error appears in the above-identified patent and that said Letters Patent is hereby corrected as shown below:

On the Title Page

Item (73) Assignee: "Leistritz Aktiengesellschaft, Nuremberg (DE)" should read
--Leistritz Extrusionstechnik, Nuernberg GmbH (DE)--.

Signed and Sealed this
Fifth Day of August, 2014

Michelle K. Lee
*Deputy Director of the United States Patent and Trademark Office*